Figure 1:
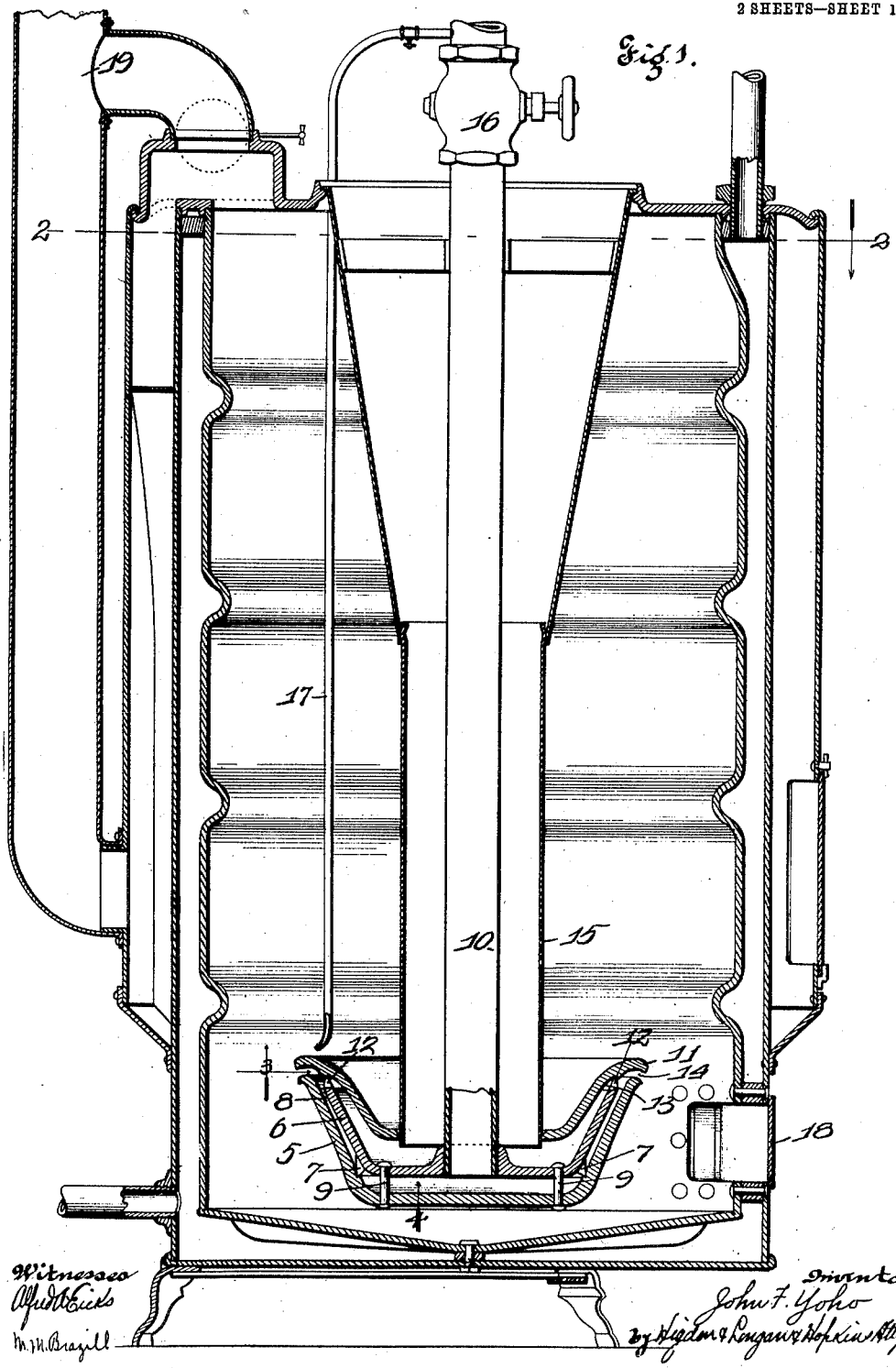

No. 783,919. PATENTED FEB. 28, 1905.
J. F. YOHO.
GAS BURNER.
APPLICATION FILED JULY 23, 1904.

2 SHEETS—SHEET 1.

No. 783,919. PATENTED FEB. 28, 1905.
J. F. YOHO.
GAS BURNER.
APPLICATION FILED JULY 23, 1904.
2 SHEETS—SHEET 2.
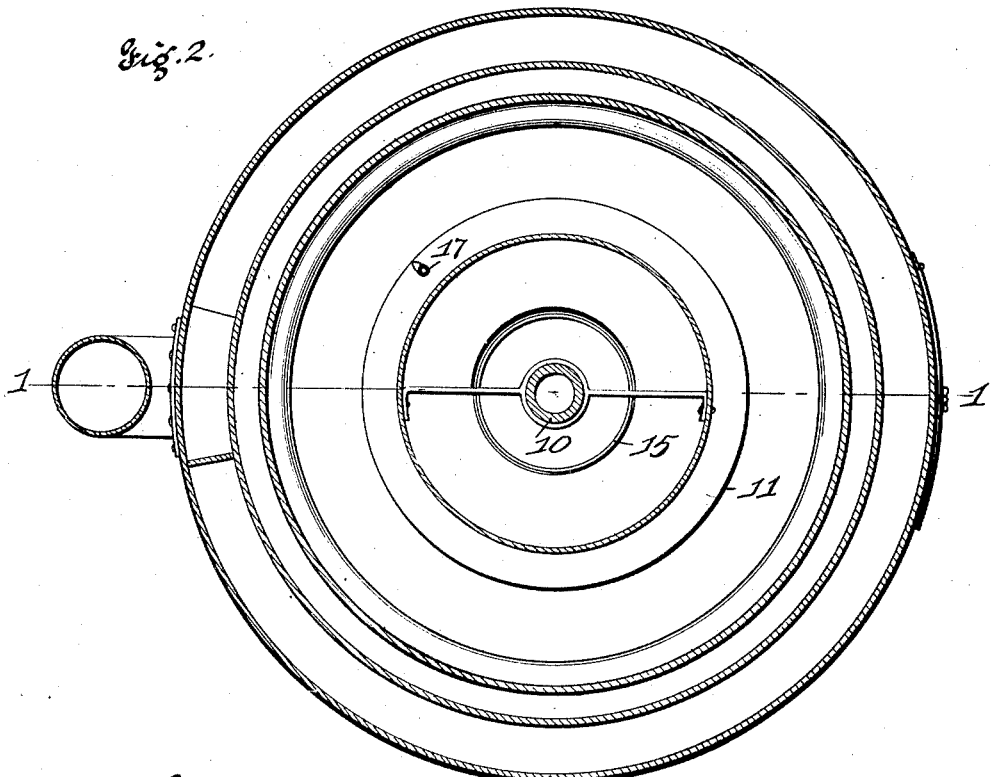
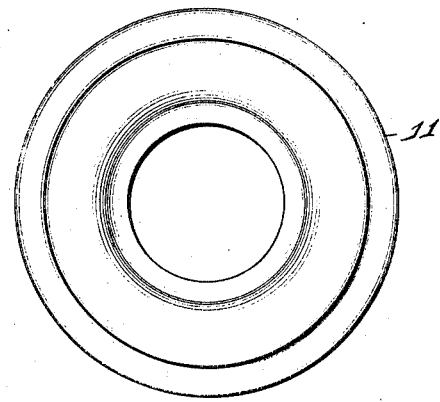
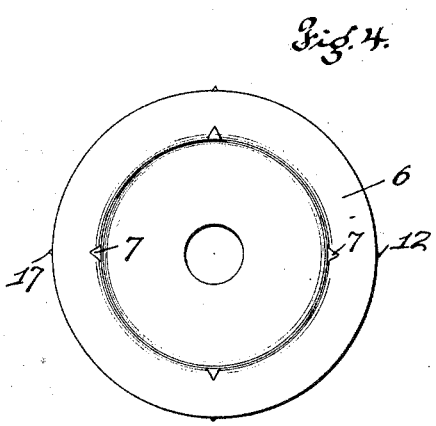

No. 783,919.

Patented February 28, 1905.

UNITED STATES PATENT OFFICE.

JOHN F. YOHO, OF SEATTLE, WASHINGTON.

GAS-BURNER.

SPECIFICATION forming part of Letters Patent No. 783,919, dated February 28, 1905.

Application filed July 23, 1904. Serial No. 217,785.

*To all whom it may concern:*

Be it known that I, JOHN F. YOHO, a citizen of the United States, and a resident of Seattle, Washington, have invented certain new and useful Improvements in Gas-Burners, of which the following is a specification containing a full, clear, and exact description, reference being had to the accompanying drawings, forming a part hereof.

My invention relates to improvements in gas-burners; and it consists of the novel features herein shown, described, and claimed.

In the drawings, Figure 1 is a vertical central section on the line 1 1 of Fig. 2. Fig. 2 is a horizontal section looking downwardly on the line 2 2 of Fig. 1. Fig. 3 is a bottom plan view of the upper burner-receptacle, as indicated by the arrow 3 in Fig. 1. Fig. 4 is a bottom plan view of the intermediate burner-receptacle, as indicated by the arrow 4 in Fig. 1.

Referring to the drawings in detail, I have shown my improved gas-burner located for operation in an air-tight receptacle adapted for heating water; but it should be understood that the burner may be used in other connections.

The burner comprises the lower upwardly-flanged receptacle 5; the intermediate upwardly-flanged receptacle 6, having spacing-blocks 7 to engage the lower receptacle and form the gas-opening 8; the rivets 9, connecting the lower and intermediate receptacles together; the gas-pipe 10, leading through the intermediate receptacle and supporting the burner; the upper upwardly-flanged receptacle 11, there being spacing-blocks 12 extending upwardly from the upper edge of the intermediate receptacle to engage the upper receptacle and form the air-opening 13, between the intermediate receptacle and the upper receptacle, and forming the mixing-chamber 14, between the upper receptacle and the upper edge of the lower receptacle; the air-pipe 15, mounted around the gas-pipe 10 and forming a vent leading from the outer air through the top of the water-heater downwardly through the combustion-chamber and through the upper upwardly-flanged receptacle 11. A globe-valve 16 controls the passage of gas to the burner, and a pilot-light pipe 17 leads from the gas-pipe 10 around the globe-valve downwardly through the top of the water-heater to a point near the burner, the object being to allow the pilot-light to burn continuously, so that when the valve 16 is opened the burner will light from the pilot-light. A door 18 through the wall of the air-tight combustion-chamber within the water-heater provides means of lighting the burner the first time or at any time that the pilot-light may become extinguished.

As soon as the burner is lighted combustion takes place around the air-pipe 15, thereby heating the air in said pipe, and the suction caused by the combustion will draw the cold air downwardly into the pipe 15 and the hot air from the lower part of the pipe outwardly through the air-opening 13 and through the mixing-chamber 14. The gas passing through the gas-opening 8 will mix with the air passing through the air-opening 13 into the mixing-chamber, and the air and gas will be discharged into the combustion-chamber ready for burning.

The water-heater forms, as before suggested, an air-tight receptacle, and the air-pipe 15 serves as a vent to supply the burner with air, and the combustion around the air-pipe heats the air and increases the draft. The products of combustion pass from the combustion-chamber in the air-tight receptacle upwardly and outwardly through the flue 19.

I claim—

1. In a gas-burner: a lower upwardly-flanged receptacle; an intermediate upwardly-flanged receptacle located in the lower receptacle; an upper upwardly-flanged receptacle seated in the intermediate receptacle; a gas-supply pipe extending into the space between the lower and intermediate receptacles; and an air-supply pipe extending into the space between the upper and intermediate receptacles; substantially as specified.

2. In a gas-burner: a lower upwardly-flanged receptacle; an intermediate upwardly-flanged receptacle located in the lower receptacle; an upper upwardly-flanged receptacle seated in the intermediate receptacle; a gas-supply pipe extending into the space between the lower and intermediate receptacles; an air-supply pipe extending into the space between the upper and intermediate receptacles; and means whereby the air supplied by the air-supply pipe is heated; substantially as specified.

3. The combination of a gas-burner comprising a lower upwardly-flanged receptacle; an intermediate upwardly-flanged receptacle seated in the lower receptacle; an upper upwardly-flanged receptacle seated in the intermediate receptacle; a gas-supply pipe extending into the space between the lower and intermediate receptacles, with an air-tight receptacle having a vent at its top; said gas-burner being seated in said air-tight receptacle; and an air-pipe leading from said vent to the space between the upper and intermediate receptacles; substantially as specified.

4. In a gas-burner: a lower upwardly-flanged receptacle; an intermediate upwardly-flanged receptacle seated in the lower receptacle and forming a gas-discharge opening; an upper upwardly-flanged receptacle seated in the intermediate receptacle and forming an air-discharge opening between the intermediate receptacle and the upper receptacle and forming the gas and air mixing chamber between the lower receptacle and the upper receptacle; means of leading the gas to the gas-discharge opening; and means of leading air to the air-discharge opening and to the mixing-chamber; substantially as specified.

5. In a gas-burner: a lower upwardly-flanged receptacle; an intermediate upwardly-flanged receptacle located in the lower receptacle; an upper upwardly-flanged receptacle seated in the intermediate receptacle; a gas-supply pipe extending into the space between the lower and intermediate receptacles; an air-supply pipe extending into the space between the upper and intermediate receptacles; means whereby the air supplied by the air-supply pipe is heated; and a pilot-light-burner adjacent to the main burner; substantially as specified.

In testimony whereof I have signed my name to this specification in presence of two subscribing witnesses.

JOHN F. YOHO.

Witnesses:
 ALFRED A. EICKS,
 M. M. BRAZILL.